US008626699B2

(12) United States Patent
Xie et al.

(10) Patent No.: US 8,626,699 B2
(45) Date of Patent: Jan. 7, 2014

(54) CONSTRUCTION OF PHOTO TRIP PATTERNS BASED ON GEOGRAPHICAL INFORMATION

(75) Inventors: Xing Xie, Beijing (CN); Yuki Arase, Osaka (JP)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/560,872

(22) Filed: Sep. 16, 2009

(65) Prior Publication Data

US 2011/0066588 A1 Mar. 17, 2011

(51) Int. Cl.
*G06F 17/00* (2006.01)
*G06N 7/00* (2006.01)
*G06N 7/08* (2006.01)

(52) U.S. Cl.
USPC ......................................................... 706/58

(58) Field of Classification Search
None
See application file for complete search history.

(56) References Cited

U.S. PATENT DOCUMENTS

| | | | |
|---|---|---|---|
| 6,868,169 B2 | 3/2005 | Staas et al. | |
| 2007/0115373 A1* | 5/2007 | Gallagher et al. | 348/231.3 |
| 2007/0271297 A1* | 11/2007 | Jaffe et al. | 707/104.1 |
| 2008/0204317 A1 | 8/2008 | Schreve et al. | |
| 2008/0319974 A1 | 12/2008 | Ma et al. | |
| 2009/0019085 A1 | 1/2009 | Abhyanker | |
| 2009/0063536 A1 | 3/2009 | Naaman et al. | |
| 2009/0143977 A1 | 6/2009 | Beletski et al. | |
| 2009/0257663 A1* | 10/2009 | Luo et al. | 382/224 |
| 2010/0002122 A1* | 1/2010 | Larson et al. | 348/333.01 |
| 2010/0076976 A1* | 3/2010 | Sotirov et al. | 707/737 |

OTHER PUBLICATIONS

Towards Automatic Extraction of Event and Place Semantics from Flickr Tags Tye Rattenbury, Nathaniel Good, and Mor Naaman Yahoo! Research Berkeley Berkeley, CA, USA (tye, ngood, mor)@yahoo-inc.com.*
Mapping the World's Photos David Crandall, Lars Backstrom, Daniel Huttenlocher and Jon Kleinberg Department of Computer Science Cornell University Ithaca, NY {crandall,lars,dph,kleinber}@cs.cornell.edu.*
Towards Automatic Extraction of Event and Place Semantics from Flickr Tags Tye Rattenbury, Nathaniel Good † and Mor Naaman Yahoo! Research Berkeley Berkeley, CA, USA (tye, ngood, mor)@yahoo-inc.com.*
Building Realistic Mobility Models from Coarse-Grained Traces Jungkeun Yoon, Brian D. Noble, Mingyan Liu Electrical Engineering and Computer Science University of Michigan Ann Arbor, MI 48109-2122 fjkyoon, bnoble, mingyang@eecs.umich.edu Minkyong Kim Department of Computer Science Dartmouth College Hanover, NH 03755 minkyong@cs.dartmouth.edu.*
Towards Automatic Extraction of Event and Place Semantics from Flickr Tags Tye Rattenbury , Nathaniel Good and Mor Naaman Yahoo! Research Berkeley Berkeley, CA, USA (tye, ngood, mor)@yahoo-inc.com.*

(Continued)

*Primary Examiner* — Kakali Chaki
*Assistant Examiner* — Ababacar Seck
(74) *Attorney, Agent, or Firm* — Lee & Hayes, PLLC

(57) ABSTRACT

Techniques for reconstructing photo trip patterns from geo-tagged photos are described. Photo trip patterns are reconstructed by mining geo-tagged photos from the Web or a data storage and segmenting the photos based on at least the geographical identification information associated with the photos. Mining semantics of each photo trip pattern may also be performed using tags associated with the photos.

20 Claims, 9 Drawing Sheets

(56) References Cited

OTHER PUBLICATIONS

Exploiting Location and Time for Photo Search and Storytelling in MyLifeBits Aleks Aris, Jim Gemmell and Roger Lueder Microsoft Research, San Francisco, CA, USA.*

Ames et al., "Why We Tag: Motivations for Annotation in Mobile and Online Media", retrived at http://www.stanford.edu/~morganya/research/chi2007-tagging.pdf, Apr. 28-May 3, 2007, ACM SIGCHI Conf, 10 pgs.

Arya et al., "Approximate Nearest Neighbor Queries in Fixed Dimensions", retrieved at http://www.cs.umd.edu/~mount/Papers/soda93-ann.pdf, Proc ACM SIAM Symposium on Discrete Algorithms, Jan. 1993, 10 pgs.

Cooper et al., "Temporal Event Clustering for Digital Photo Collections" ACM Trans on Multimedia Computing, Communications and Applications, vol. 1, No. 3., Apr. 2005, 23 pgs.

"Flickr—Photo Sharing", retrived Aug. 4, 2009 at http://www.flickr.com, 1 pg.

Giannotti et al., "Efficient Mining of Temporally Annotated Sequences", retrived at http://www.siam.org/meetings/sdm06/proceedings/032giannottif.pdf on Aug. 4, 2009, Proc SIAM Conf on Data Mining, Apr. 2006, pp. 346-357.

Jing et al., "VirtualTour: An Online Travel Assistant Based on High Quality Images", Proc ACM Intl Conf on Multimedia, Oct. 23-27, 2006, 4 pgs.

Kleinberg,"Authoritative Sources in a Hyperlinked Environment", Journal of the ACM, vol. 46, No. 5, Sep. 1999, pp. 604-632.

Loui et al., "Automated Event Clustering and Quality Screening of Consumer Pictures for Digital Albuming", IEEE Transactions on Mulitmedia, vol. 5, No. 3, Sep. 2003, pp. 390-402.

Naaman et al., "Automatic Organization for Digital Photographs with Geographic Coordinates", Proc Joint Conf on Digital Libraries (JCDL04), Jun. 7-11, 2004, pp. 53-62.

Naaman et al.,"Automatically Generating Metadata for Digital Photographs with Geographic Coordinates", Proc 13th Intl World Wide Web Conf on Alternate Track Papers and Posters, May 17-22, 2004, pp. 244-245.

Pevzner et al.,"A Critique and Improvement of an Evaluation Metric for Text Segmentation", Association for Computational Linguistics, vol. 16, No. 1, Feb. 1994, 22 pgs.

Picasa 3, retrived at http://picasa.google.com/ on Aug. 4, 2009, 1 pg.

Platt et al. , "PhotoTOC: Automatic Clustering for Browsing Personal Photographs", Microsoft Research, Technical Report SR-TR-2002-17, Feb. 2002, retrieved at http://research.microsoft.com/pubs/68922/phototoc-pacrim.pdf on Aug. 4, 2009, 5 pgs.

Rattenbury et al., "Methods for extracting Place Semantics from Flickr Tags", ACM Transatcions on the Web, Vo. 3, No. 1, Article 1, Jan. 2009, 30 pgs.

Rattenbury et al., "Towards Automatic Extraction of Event and Place Semantics from Flickr Tags", SIGIR'07, Jul. 23-27, 2007, 8 pgs.

Torniai et al., "Sharing, Discovering and Browsing Geotagged Pictures on the Web", May 2007, retrived at http://www.hpl.hp.com/personal/Steve_Cayzer/downloads/papers/geospatial_final_pdf, 18 pgs.

Torpelund-Bruin et al., "Geographic Knowledge Discovery from Geo-referenced Web 2.0", 2008 Intl Workshop on Education Technology and Training & 2008 Intl Workshop on Geoscience and Remote Sensing, retrived at http://ieeexplore.ieee.org/stamp/stamp.jsp?tp=&arnumber=5070363&isnumber=5070285, Dec. 2008, pp. 291-294.

Wang et al., "Detecting Dominant Locations from Search Queries", retrived at http://research.microsoft.com/en-us/people/xingx/qld.pdf , Aug. 15-19, 2005, 8 pgs.

Wikipedia, "Paradise, Nevada", retrieved Aug. 4, 2009 at http://en.wikipedia.org/wiki/Paradise,_Nevada, Jun. 2009, 2 pgs.

Yuan et al.,"Mining GPS Traces and Visual Words for Event Classification" retrived at http://portal.acm.org/ft_gateway.cfm?id=1460099&type=pdf&coll=GUIDE&dl=GUIDE &CFID=46277133&CFTOKEN=38029187, Proc ACM Intl Conf on Multimedia Information Retrieval, Oct. 30-31, 2008, pp. 2-9.

Zheng et al., "Mining Interesting Locations and Travel Sequences from GPS Trajectories", Proc Intl World Wide Conf, Apr. 20-24, 2009, 10 pgs.

* cited by examiner

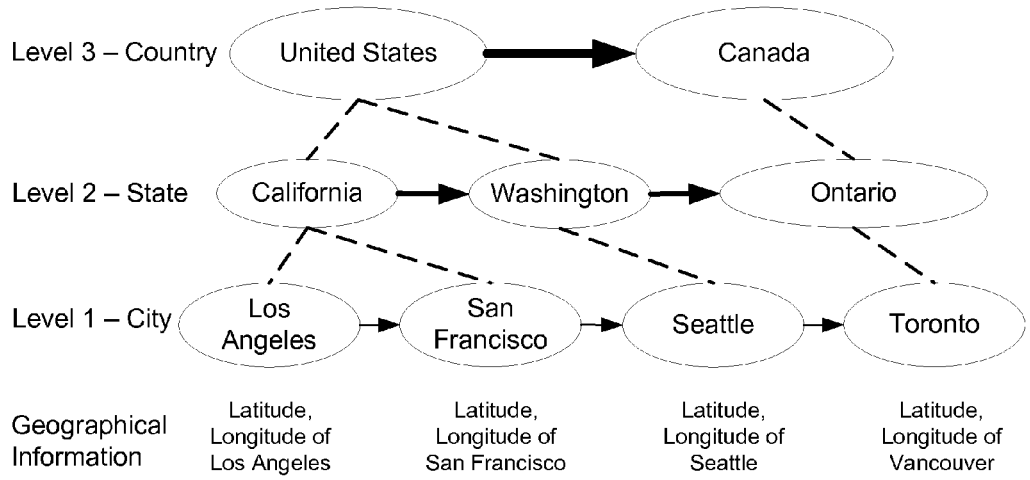

Fig. 2

| Metadata | Description | Example |
|---|---|---|
| Photo ID 302 | Unique photo ID | 1234567890 |
| Owner ID 304 | User ID of the owner of the photo | abc123@XYZ |
| Timestamp 306 | Date/time of when the photo was captured | 2008-09-26 10:59:27 |
| Latitude/Longitude 308 | Latitude/longitude of where the photo was captured | (51.500, -0.120) |
| Tag 310 | Description tags assigned by the owner | {"London", "Big Ben", Sightseeing"} |
| City 312 | City name converted based on latitude/longitude | London |
| State 314 | State name converted based on latitude/longitude | England |
| Country 316 | Country name converted based on latitude/longitude | United Kingdom |

CONSTRUCTION OF PHOTO TRIP PATTERNS BASED ON GEOGRAPHICAL INFORMATION

BACKGROUND

The prevalence of digital image capturing devices such as digital cameras and mobile phones equipped with camera capability, coupled with increasing popularity of Web posting, allow people to post their photographs (hereinafter referred to as photos) on the Web for sharing with others. Many websites allow people to add tags to photos in order to make it relatively easy to organize and share large number of photos. Tags allow people posting photos on the Web to add contexts to photos, as people can organize the photos better as well as communicate with their friends and families with the tags. Some of these tags are considered as geo-tags and adding a geo-tag to a photo is known as geotagging.

Geotagging is a process of adding geographical identification information, or metadata, to various media such as photos. A geo-tagged photo usually has geographical identification information including the latitudinal and longitudinal coordinates of the location where the geo-tagged photo was captured. The geographical identification information of a geo-tagged photo may be either recorded automatically by the digital image capturing device at the time the photo was captured or entered manually by a person when posting the photo on a website. Geotagging can help one to find photos taken near a given location by searching with latitudinal and longitudinal coordinates on the Web.

Given the ever-increasing number of photos being posted on the Web, it is not easy to search and organize photos even though the photos may be geo-tagged. With a large number of photos, it is also time-consuming to organize the photos taken from a trip as a sequence of photos captured at various locations visited during the trip. Accordingly, there is an ongoing need to improve techniques for mining geo-tagged photos and reconstructing sequences of memorable moments and scenes, such as trips, from geo-tagged photos.

SUMMARY

Techniques for reconstructing photo trip patterns from geo-tagged photos are described. One technique reconstructs photo trip patterns by mining geo-tagged photos from the Web and segmenting the photos based on at least geographical identification information associated with the photos. In other techniques, mining semantics of each photo trip pattern may also be performed using tags associated with the photos.

This summary is provided to introduce concepts relating to mining of photo trip patterns among geo-tagged photos. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 2 illustrates an exemplary geographical hierarchy of the location where a photo was captured.
FIG. 3 illustrates an exemplary set of metadata associated with a photo.

DETAILED DESCRIPTION

This disclosure describes techniques for reconstructing photo trip patterns from geo-tagged photos. As people usually take photos to record memorable moments and scenes in their life, it is possible to reconstruct a person's memorable moments from a collection of photos taken by such person based on geo-tags and timestamps associated with the photos. The techniques described below extract photo trip patterns from large scale personal geo-tagged photos posted on the Web. A photo trip may be, for example, a set of photos associated with information of cities or destinations a photo owner visited and the travel time among the cities or destinations. A photo trip pattern may be, for example, a sequence of cities or destinations a user, or photo owner, visited as well as typical travel time between among the cities or destinations and semantics of the trip. To extract photo trip patterns, a set of photos is segmented into a number of subsets of photos using algorithms involving location gaps and timestamps. Frequent photo trip patterns are then mined from these subsets of photos. Finally, semantics of photo trip patterns are extracted from tags of the photos, where the hierarchy of the tags is considered in the extraction of semantics.

While aspects of described techniques relating to reconstruction of photo trip patterns from geo-tagged photos can be implemented in any number of different computing systems, environments, and/or configurations, embodiments are described in the context of the following exemplary system architecture(s).

Exemplary Scenario

Figure 1:
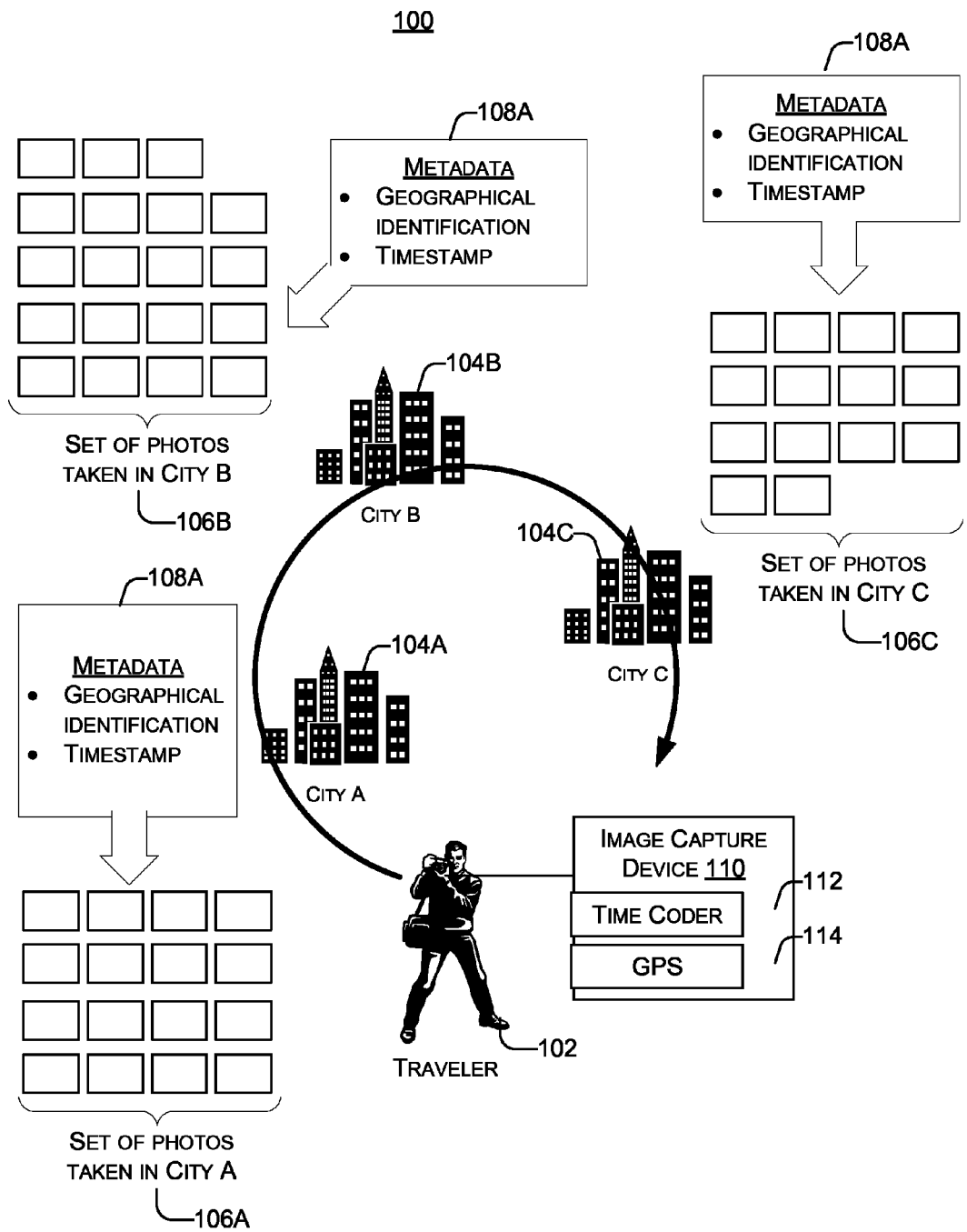
FIG. 1 illustrates an exemplary scenario of photo trips.

FIG. 1 illustrates an exemplary scenario 100 of photo trips during which the city 104A (City A), city 104B (City B), and city 104C (City C) are visited by traveler 102. As with any typical traveler, the traveler 102 takes, or captures, photos with his/her image capturing device 110, such as a digital camera for example, as the traveler 102 visits each of the cities 104A-C. While visiting the city 104A, the traveler 102 captures a set of photos 106A of various sites and moments in the city 104A. While visiting the city 104B, the traveler 102 captures an additional set of photos 106B of various sites and moments in the city 104B. Similarly, the traveler 102 captures another set of photos 106C while visiting the city 104C to record memories of various sites and moments in the city 104C.

Following the photo trips to the cities 104A, 104B, and 104C, the traveler 102 ends up with a collection of photos that include the set of photos 106A taken in the city 104A, the set of photos 106B taken in the city 104B, and the set of photos 106C taken in the city 104C. The traveler 102, who is the photo owner of a collection of photos captured during the photo trips, may decide to post some or all of these photos on the Web such as, for example, on a social networking website or a personal blog webpage. Additionally or alternatively, the traveler 102 may post some or all of these photos to data storage somewhere, such as a storage device or a computer that may not be connected to the Internet. In any case, whether the photos are posted on the Web or to data storage, techniques disclosed herein are applicable.

It should be understood that, while cities is used in the example, other destinations, sites, or locations may be used. For example, a traveler may visit national parks in the United States like Yellowstone, Zion, and Grand Canyon. None of these sites are cities but are certainly identifiable.

When the photo owner posts photos on the Web, the photo owner can enter user information to be associated with the photos posted. The user information may include, for example, a user identification, or user ID, and a user location, such as the location of the photo owner's residence. Since the format of the user location as entered by the photo owner may not be uniform or consistent from one photo owner to another, the techniques described in this disclosure can convert the user-entered user location to a predetermined format. For example, ambiguous user-entered locations, such as "Seattle, WA, USA" and "Seattle US," are converted to a predetermined format, for example, as "Seattle/Washington/United States." Table 1 shows an example of the user information of the photos taken by the traveler 102.

TABLE 1

Example of User Information

| Name | Description | Example |
| --- | --- | --- |
| User ID | Unique user ID | abc123@XYZ |
| User location | Location entered freely by a user | Brooklyn, New York |
| City | Converted city name | New York |
| State | Converted state name | New York |
| Country | Converted country name | United States |

A set of users can be modeled as $\mathbb{U} \triangleq \{u\}$, where u is a tuple $\{\theta_u, C_u, S_u, \mathcal{N}_u\}$ containing a unique user ID as $\theta_u$ and the location as the scope of city/state/country as $C_u / S_u / \mathcal{N}_u$, respectively. It should be noted that, not all users enter their user location and, therefore, not all photos have these attributes associated therewith.

After the photos are posted on the Web, they can be mined and photo trip patterns can be extracted to reconstruct the photo trips based on metadata associated with the photos. The metadata may be of many different types and/or formats. As one example, timestamps are a form of metadata associated with photos. As shown in FIG. 1, the image capturing device 110 is equipped with a time coder 112. As a photo is taken by the image capturing device 110, the time coder 112 associates a timestamp to the photo to indicate the date and time when the photo was taken. A timestamp indicates temporal information related to the respective photo, such as the date (e.g., represented by the month, day, and year in any form or order) and time (e.g., represented by the hour of the day, minute of the hour, and second of the minute) the photo was captured. Unless such capability is disabled by the traveler 102, each photo captured with the image capturing device 110 should have a timestamp associated with it.

In addition to timestamps, geographical information is another kind of metadata that can be associated with photos. The geographical information of a photo is typically related to the location where the photo was captured. In general, there are two ways to assign geographical information to photos. One way is to use a image capturing device that automatically records the geographical information (typically represented by the latitudinal and longitudinal coordinates) of a location where a photo is captured when capturing the photo image. For example, a digital image capturing device with an internal global positioning system (GPS) receiver can record the latitude and longitude of the location where a photo is taken when capturing the photo image. Another way is to use an external GPS receiver and synchronize the recorded latitudinal and longitudinal information to photos later. Alternatively, the geographical information, which may be latitudinal and longitudinal coordinates, can be manually assigned using the interface on some photo sharing websites when posting the photos on the Web. As shown in FIG. 1, the image capturing device 110 includes a GPS receiver 114. As a photo is taken by the image capturing device 110, the GPS receiver 114 associates geographical information of the location where the photo is taken to the photo to indicate such location.

Manually assigned geographical information, however, tends to be less accurate than desired. For example, when manually assigning latitudinal and longitudinal coordinates to a photo, the photo owner may look at a map to determine the approximate coordinates of the city where the photo was taken. If the map has a relatively small scale, such that it shows the entire state, country, or the world for instance, then the approximate coordinates of the location where the photo was taken may not be very accurate. To compensate for the inaccuracy, the techniques represent the geographical information as a hierarchy of geographical regions, as will be described next.

Exemplary Geographical Hierarchy

FIG. 2 illustrates an exemplary geographical hierarchy 200 of the location where a photo was captured. The hierarchy 200 has a plurality of levels and is derived from the geographical information associated with the photo, for example, the latitudinal and longitudinal coordinates of the location where the photo was captured. In one embodiment, the hierarchy 200 has at least two levels, consisting of a geographical region of a first level and a geographical region of a second level that encompasses the geographical region of the first level. For example, the hierarchy 200 may have a first level showing the city where the photo was captured and a second level showing the country in which the city where the photo was captured is located. In another embodiment, the hierarchy 200 has three levels, as shown in FIG. 2, including a first level showing the city where the photo was captured, a second level showing the state that includes the city, and a third level showing the country that includes the state. In other embodiments, there may be more levels in the hierarchy 200 such as four levels, for example, including city, county, state, and landmarks where the photo was captured.

In the exemplary geographical hierarchy 200 shown in FIG. 2, the geographical region of the first level is city and includes the cities of Los Angeles, San Francisco, Seattle, and Toronto. The geographical region of the second level is state (and equivalently, provinces) and includes the states of California, which encompasses Los Angeles and San Francisco, and Washington, which encompasses Seattle, as well as the province of Ontario, which encompasses Toronto. The geographical region of the third level is country, or nation, and includes the countries of United States, which encompasses California and Washington, and Canada, which encompasses Ontario. In one embodiment, the hierarchy 200 is derived from the latitudinal and longitudinal coordinates of the photos taken on the photo trips by the traveler 102 regardless of whether the coordinates were obtained by an internal GPS receiver of the digital image capturing device of the traveler 102 or an external GPS receiver, or entered manually by the traveler 102.

There are various ways to convert the latitude and longitude of a photo into a hierarchical representation of the location where the photo was captured. In one embodiment, a nearest-neighbor searching algorithm is used to extract the nearest city within a distance threshold of the latitudinal and longitudinal coordinates associated with the photo. Given a set of data points in a d-dimensional space, the algorithm detects the k nearest points of a query point, such as the location where the photo was captured as indicated by its latitudinal and longitudinal coordinates. The distance between two points can be defined in a number of ways, including Euclidean distance and Manhattan distance for example. In one embodiment, the nearest neighbor from the latitudinal and longitudinal coordinates of a photo is identified from a set of centers of cities in a 2-dimensional space. That is, the city with the shortest distance between the latitude/longitude of the city center and the latitude/longitude of the photo is identified as the nearest city.

Exemplary Set of Metadata

FIG. 3 illustrates an exemplary set of metadata 300 associated with a photo posted on the Web. In one embodiment, the set of metadata 300 includes a unique photo ID 302 associated with the photo, a user ID 304 of the photo owner, a timestamp 306 of the date and time of when the photo was captured, latitude/longitude 308 of the location where the photo was captured, and a tag 310 having semantics describing the location where the photo was captured. In other embodiments, the set of metadata 300 may include other data fields or elements that together form the metadata 300 such as, for example, elevation, user's impression, etc. Semantics associated with photos may include description of places and landmarks to see when visiting locations, representative activities that people expect to enjoy during the trip, and/or feelings attached to the places visited. For example, trip semantics for Sydney, Australia can include "Opera House," "Harbor Bridge," and "Diving." In another embodiment, the set of metadata 300 further includes the geographical hierarchy of the location where the photo was captured. With a three-level hierarchy, the set of metadata 300 further includes, for example, the city, state, and country associated with the latitudinal and longitudinal coordinates of the location where the photo was captured.

In one embodiment, a set of photos is modeled as $\mathbb{p} \triangleq \{p\}$, where p is defined as a tuple $(\theta_p, t_p, u_p, \delta_p, \lambda_p, C_p, S_p, \mathcal{N}_p)$ containing a unique photo ID as $\theta_p$, captured time as $t_p$, unique user ID as the photo owner as $u_p$, and the latitude/longitude of the location where the photo was captured as $\delta_p/\lambda_p$, also represented in the form of city/state/country as $C_p/S_p/\mathcal{N}_p$, respectively. Based on this definition, each user's photo collection is denoted as $\mathbb{p}_u \subseteq \mathbb{p}$, where all of the photos $p \subseteq \mathbb{p}_u$ satisfy the constraint of $u_p = \theta_u$ and are sorted in chronological order. That is, $\mathbb{p}_u$ can be regarded as a spatial and temporal sequence. In addition, a set of the user's photos captured in a city $C_{i,i}$ is denoted as $\mathbb{p}_{u,c_i} \subseteq \mathbb{p}_u$.

In one embodiment, tags associated with the photos of a set of photos are modeled separately from the photos. In one embodiment, the variable l denotes a tag and $\mathbb{L}$ denotes the set of all tags. Each photo can have multiple tags and each tag is often assigned to multiple photos. For example, a photo of the city London can have multiple tags such as "London," "shopping," and "Big Ben." Similarly, the tag "sunny" can be assigned to, or associated with, a number of photos such as photos taken in Los Angeles, Barcelona, and Sydney. In one embodiment, the notation $\mathbb{L}_s$ is used to denote the set of tags that appear in any subset $\mathbb{p}_s \subseteq \mathbb{p}$ of a set of photos. The subset of photos associated with a specific tag is denoted as $\mathbb{p}_l \subseteq \mathbb{p}$. Accordingly, photos with the tag l in a subset $\mathbb{p}_S$ of $\mathbb{p}$ are denoted as $\mathbb{p}_{S,l}$. In addition, the notation $\mathbb{U}_{S,l}$ is used to denote the set of users associated with photos in $\mathbb{p}_{s,l}$, and $\mathbb{U}_S$ denotes the set of all users associated with photos in $\mathbb{p}_S$.

Exemplary Sequence of Photo Trips

Figure 4:
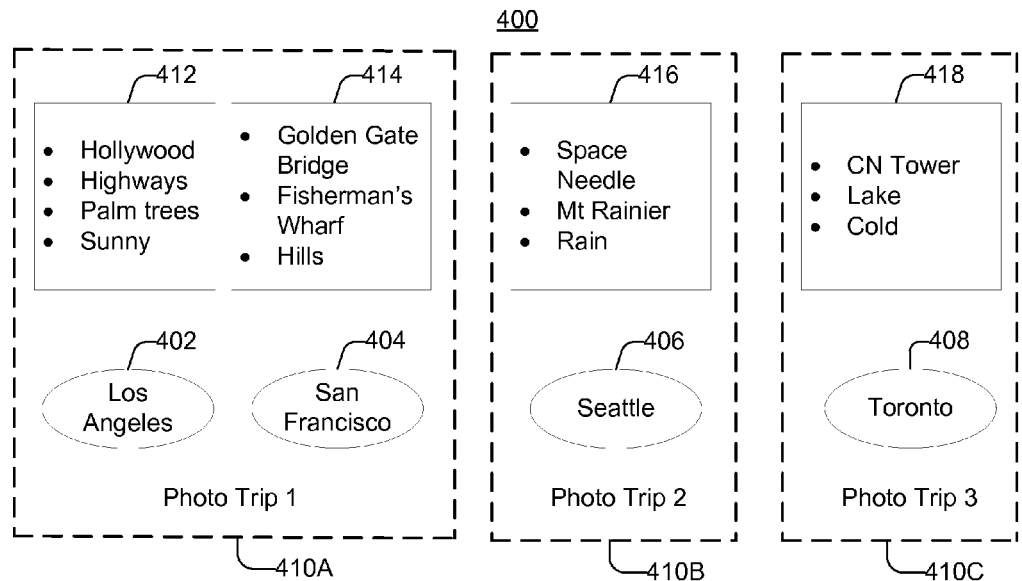
FIG. 4 illustrates an exemplary sequence of photo trips.

FIG. 4 illustrates an exemplary sequence of photo trips 400 of a user. As shown in FIG. 4, the sequence of photo trips 400 includes a first photo trip 410A, a second photo trip 410B, and a third photo trip 410C. Two cities, city 402 and city 404, were visited on the first photo trip 410A. One city, city 406, was visited on the second photo trip 410B. One city, city 408, was visited on the third photo trip 410C. Photos were taken in each of the cities 402, 404, 406, and 408, and there are tags associated with these photos. A set of tags 412 is associated with the set of photos taken in city 402, a set of tags 414 is associated with the set of photos taken in city 404, a set of tags 416 is associated with the set of photos taken in city 406, and a set of tags 418 is associated with the set of photos taken in city 408.

In one embodiment, a photo trip is defined by the expression $\mathcal{P}T = (C, T, \mathcal{P}, \mathcal{L})$. Here, $C = (C_1, \ldots, C_n)$ denotes the sequence of cities users visited, $T = (T_1, \ldots, T_{n-1})$ denotes the sequence of travel time between two consecutive cities, and $\mathcal{P} = (\mathbb{p}_{c_1}, \ldots, \mathbb{p}_{c_n})$ and $\mathcal{L} = (\mathbb{L}_{c_1}, \ldots, \mathbb{L}_{c_n})$ denote the set of photos captured in the visited cities and the tags assigned to the photos, respectively, as shown in FIG. 4.

As will be further described in detail below, the techniques disclosed herein mine frequent photo trip patterns as a frequently visited set of cities and the associated typical transition times among cities, as well as characteristic tags that represent the trip semantics. More specifically, a proposed photo trip pattern mining technique first segments a collection of photos from a number of users into a number of subsets of photos representing a number of photo trips. Photo trip patterns are then extracted from the subsets of photos. Further, trip semantics are extracted by mining tags associated with photos taken in the cities of frequent photo trip patterns.

As an example, a collection of photos is denoted as $\mathbb{p}$, with user information $\mathbb{U}$ and a set of tags $\mathbb{L}$ associated with $\mathbb{p}$. A parameter determining the balance between captured time and distance gap is denoted as $\alpha$, a minimum support is denoted as $s_{min}$, and a temporal threshold is denoted as $\tau$. Accordingly, given a set of photo collections $(\mathbb{p}, \mathbb{U}, \mathbb{L})$, the segmentation of the collection of photos can be expressed as $\mathcal{P}T = \text{PhotoCollectionSegmentation}(\mathbb{p}, \mathbb{U}, \alpha)$, the mined photo trip patterns can be expressed as $\mathcal{D} = \text{TripPatternMining}(\mathcal{P}T, s_{min}, \tau)$, and the identification of trip semantics can be expressed as $\text{TripSemanticIdentification}(\mathcal{D}, \mathbb{L})$.

Exemplary Photo Collection Segmentation

Figure 5:
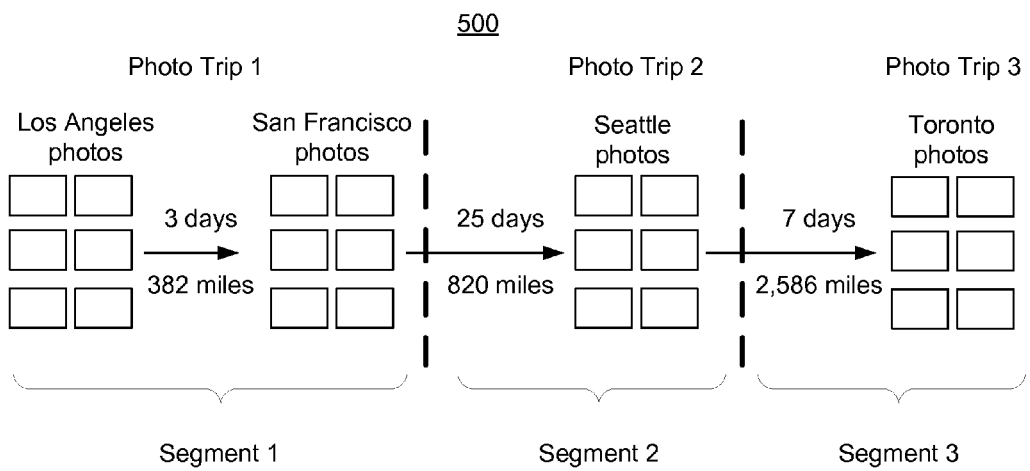
FIG. 5 illustrates an exemplary segmentation of a photo collection

FIG. 5 illustrates an exemplary segmentation of a photo collection 500. As shown in FIG. 5, the photo collection 500 is segmented into three segments: segment 1, segment 2, and segment 3. Each segment corresponds to a photo trip and each segment corresponds to a subset of photos from the photo collection 500 being segmented. In the sample shown, segment 1 corresponds to photo trip 1, during which the cities of Los Angeles and San Francisco were visited. Segment 2 corresponds to photo trip 2, during which the city of Seattle was visited. Segment 3 corresponds to photo trip 3, during which the city of Toronto was visited. The transition time gap between Los Angeles and San Francisco is 3 days, and the location gap, or distance, is 382 miles. The transition time gap between the trip to San Francisco and the trip to Seattle is 25 days, and the location gap is 820 miles. The transition time gap between the trip to Seattle and the trip to Toronto is 7 days, and the location gap is 2,586 miles.

In one embodiment, the photo collection 500 is segmented based on just the geographical information (e.g., the latitudinal and longitudinal coordinates) associated with the photos. In an alternative embodiment, the photo collection 500 is segmented based on both the temporal information (e.g., timestamps) and geographical information associated with the photos. In the interest of brevity, only the embodiment using both temporal and geographical information to segment the photo collection will be described below.

When segmenting a photo collection based on temporal information, photos in the collection are first sorted chronologically into a list of photos according to the timestamps. If $g_i$ is defined as the captured time difference between photo $p_i$ and photo $p_{i+1}$ in the sorted list of photos, then $g_N$ is considered a gap between events if it is much longer than a local log gap average as expressed by Equation (1) below.

$$\log(g_N) \geq K + 1/(2d+1) * \sum_{i=-d}^{d} \log(g_{N+i}) \quad (1)$$

Here, K is a suitable threshold, and d is a window size. If N+i refers to a photo beyond the end of the collection, the term is ignored, and the denominator 2d+1 is decremented for every ignored term to keep the average normalized.

When segmenting a photo collection based on geographical information, photos in the collection that were captured in the same city as the user's city are separated out, since it is apparent that there exists a change of trips from one trip to another. For example, the separation is performed according to the expression $\mathbb{P}_{u, c'} \subseteq \mathbb{P}_u \cdot (C_u = C_p)$. Afterwards, noticeable gaps of transition times and noticeable distances between consecutive cities are detected and used to segment the rest of the photos. The transition times and distances of city $C_i$ and $C_{+1}$ as the gap between captured time and locations of the last photo of $\mathbb{P}_{u, c'}$, $p_{last}$ and the first photo of $\mathbb{P}_{u, c^{i+1}}$, $p_{init}$. The transition time gap and location gap are calculated based on Equations (2) and (3), respectively, below.

time[hour]=$t_{pinit}-t_{plast}$ (2)

distance[km]=$D \cdot \phi$ where (3)

$\phi$[rad]=2·arcsin {sqrt[sin$^2$($\Delta\delta$/2)+cos($\delta_{plast}$)·cos($\delta_{pinit}$) ·sqrt[sin$^2$($\Delta\lambda$/2)]} (4)

Here, $\delta_{plast}$ and $\delta_{pinit}$ at are the latitudes of $p_{last}$ and $p_{init}$, $\Delta\delta$ and $\Delta\lambda$ are the differences of latitude and longitude of these photos, respectively, and D is radius of the earth, for example, 6,370 km. By defining $\alpha$ as a parameter to balance the effects of transition time gap and location gap, the $g_N$ in Equation (1) can be expresses as Equation (5) below.

$g_N=\alpha$·time[hour]+(1-$\alpha$)·distance[km] (5)

A gap is considered a change of trips when it is much larger than a local gap average. The collection of photos is segmented accordingly. For instance, in FIG. 5, the photo collection 500 is segmented into photo trip 1, photo trip 2, and photo trip 3. The segmentation is based on both the location gap, or distance, and the transition time gap among the locations or cities visited. Between photo trip 1 and photo trip 2, the transition time gap is 25 days and the location gap is 820 miles. Between photo trip 2 and photo trip 3, the transition time gap is 7 days and the location gap is 2,586 miles. With photo trip 1, the transition time gap between Los Angeles and San Francisco is 3 days and the location gap is 382 miles. By adjusting the parameter $\alpha$, results of segmentation may change accordingly. For example, the same photo collection 500 may be segmented into four photo trips with the trip to Los Angeles being identified as one trip, and the trip to San Francisco being identified as another separate trip.

Following segmentation of the photo collection, frequent photo trip patterns are identified. In one embodiment, a mining algorithm known as Temporary Annotated Sequence (TAS) is used to mine, or identify, photo trip patterns since a sequence of cities annotated with transition times in a photo trip can be regarded as a temporary annotated sequence. In other embodiments, mining algorithms other than TAS are employed to extract photo trip patterns. TAS is an extension of sequential patterns that enrich sequences with information about the typical transition times between elements of the sequences, expresses as follows:

$$T = C_1 \xrightarrow{\tau 1} C_2 \xrightarrow{\tau 2} \cdots \xrightarrow{\tau n-1} C_n$$

Similar to traditional sequential pattern mining, the notion of frequency is based on the notion of support of a TAS, which is defined as the number of input sequences that contain the TAS. The key notion of containment can be determined as Definition: $\tau$-containment $\leq_\tau$ Given a time threshold $\tau$, a TAS is $\tau$-contained (or occurs) in an input sequence I= $\langle\langle I_1, \tau_1 \rangle, \ldots \langle_m, \tau_m \rangle\rangle$, denoted as $T \leq_\tau I$, if and only if there exists a sequence of integers $1 \leq i_1 < \ldots < i_n \leq m$ such that:

$\forall 1 \leq k \leq n. \ s_k \subseteq I_{ik}$  1.

$\forall 2 \leq k \leq n. \ |\alpha_k - \alpha'_k| \leq \tau$  2.

where $\forall 2 \leq k \leq n. \ \alpha'_k = T_{ik} - T_{ik-1}$

Essentially, a TAS T is contained into an input sequence I if there is an occurrence of T in I (condition 1) having transition times similar to the annotations in T in terms of the threshold $\tau$ (condition 2). An example of $\tau$-containment is as follows:

T: {Rome} $\xrightarrow{5 \text{ days}}$ {Florence} $\xrightarrow{8 \text{ days}}$ {Venice}

I: {Rome}, 0 $\longrightarrow$ {Florence, Pisa}, 3 $\longrightarrow$ {Milano}, 10 $\longrightarrow$ {Venice}, 14

|--- 3 days ---|--- 14 - 3 = 11 days ---|

In this example, TAS T is a photo trip visiting Rome at first and moving to Florence 5 days later, finally arriving in Venice after staying 8 days in Florence. The sequence in T occurs in I, possibly including visit to Pisa instead of Florence and possibly including Milano between Florence/Pisa and Venice. The transition times of the occurrence differ at most of 2 time units (days) between T and I. Therefore, if $\tau \geq 2$, we have that $T \leq_\tau I$.

TAS mining extracts frequent sets of TAS that are contained in at least $s_{min}$ input sequences with the condition of threshold τ regarding the transition time, where $s_{min}$ is a minimum support threshold provided by the user. As TAS mining is performed on photo trips, e.g., a set of segmented city sequences annotated with transition times ($C$,, T), frequent city sequences and the associated transition times among the cities are resultantly extracted as frequent photo trip patterns. However, although the TAS mining algorithm can detect frequent TAS, it cannot determine each pattern's semantics. It is thus difficult to interpret what people can expect from these trip patterns. Therefore, in some embodiments, semantics of frequent photo trip patterns are mined, or identified, based on tags assigned to photos captured in cities of frequent photo trip patterns.

In one embodiment, mining of semantics is based on the term frequency/inverse document frequency (TF/IDF) technique. An assumption is that tags that are primarily associated with the cities of a photo trip pattern but are not associated with other cities are more representative of the identified patterns. Here, one of the characteristics of the mined dataset is that tags have a hierarchy such that tags can be associated with the various levels of the geographical hierarchy, e.g., city/state/country. As the mined dataset contains tags from photos from all over the world, a rather large set of data, elements of the traditional TF/IDF calculation are modified in mining the semantics as described below.

Each tag l used in a set of cities $C$ in a photo trip pattern is scored, as l∈ $\mathbb{L}_C$, according to the following factors: term frequency tf, inverse document frequency idf, and user frequency uf. The term frequency tf for a given tag l used in a set of cities $C$ in a photo trip pattern is defined as the count of the number of times l was assigned for photos captured in those cities, expressed as tf(C, l)≜ | $\mathbb{P}_{C, l}$| where C={$C_1$, ..., $C_n$}. The inverse document frequency idf for a tag l computes the overall ratio of the tag l among all photos under consideration. To obtain a meaningful value of the inverse document frequency idf for a tag l in the cities, the scope under consideration should be limited. Without this limitation, it is very difficult to filter out locally common tags, since the dataset includes photos from the entire the world and the granularity of the inverse document frequency based on this data can be too large. For example, one of the common tags used in Paris is "concert" while it is not so common on a worldwide basis. Thus, the inverse document frequency based on the whole dataset cannot filter out such locally common tags.

With respect to the hierarchy of geographical regions in the metadata associated with the photos, the relationship of the levels for a three-level hierarchy is defined as $C_i \subset S_i \subset N_i$ where ($C_i \in C$, $S_i \in S$, $N_i \in N$ |∃i∈n). Therefore, the inverse document frequency idf for a tag l is modified as the overall ratio of the tag l used in a set of instances among all photos taken in the instances according to Equation (6) below.

$$idf(C,.,l) \mathbb{P}_{J} | \triangleq |/| \mathbb{P}_{J,l}| \quad (6)$$

where $J$=($S_1$, ..., $S_n$ | $C_i \subset S_i$) or ($N_i$, ..., $N_n$ $C_i \subset N_i$)

The inverse document frequency idf of the state level is calculated by idf(S, l) $\mathbb{P}_S$ |≜|/| $\mathbb{P}_{S,l}$| where ($S$ = ($S_1$, ..., $C_i | S_n \subset S_i$) while for country level it is calculated by idf($N$, l)≜ | $\mathbb{P}_N$ |/| $\mathbb{P}_{N,l}$| where ($N$ =($N_1$, ..., $N_n$ $C_i \subset N_i$). The hierarchy to bed used is based on the size of an instance and density of photos. If states of cities of a photo trip pattern are small or the number of tags used there is small, the algorithm can use an upper hierarchy such as countries.

The user frequency uf with respect to a tag l accounts for the effect from the number of users who used the tag l. An assumption made is that a tag is more valuable the larger the number of different users who use that tag. More specifically, the percentage of the users who used the tag l for photos taken in a set of cities among all the users who have taken a photo in the cities is computed according to Equation (7) below.

$$uf(C,.,l) \triangleq | \mathbb{U}_{C,.l}|/| \mathbb{U}_C| \quad (7)$$

A score is calculated for a tag l for a photo trip pattern based on Equation (8) below. The higher the score is the more likely the tag l is a trip semantic.

$$score(P\ T,l)=tf(C,l)\cdot idf(J\ l)\cdot uf(C,l) \quad (8)$$

There are some prior art techniques for determining whether each tag has a coherent semantic of places. However, the concept of "place" in the context of these prior art techniques is smaller region, e.g., San Francisco Bay Area, compared to the geographical regions utilized by the techniques described in this disclosure. Moreover, prior art techniques do not consider the hierarchy of tags.

Exemplary Processes

Figure 6:
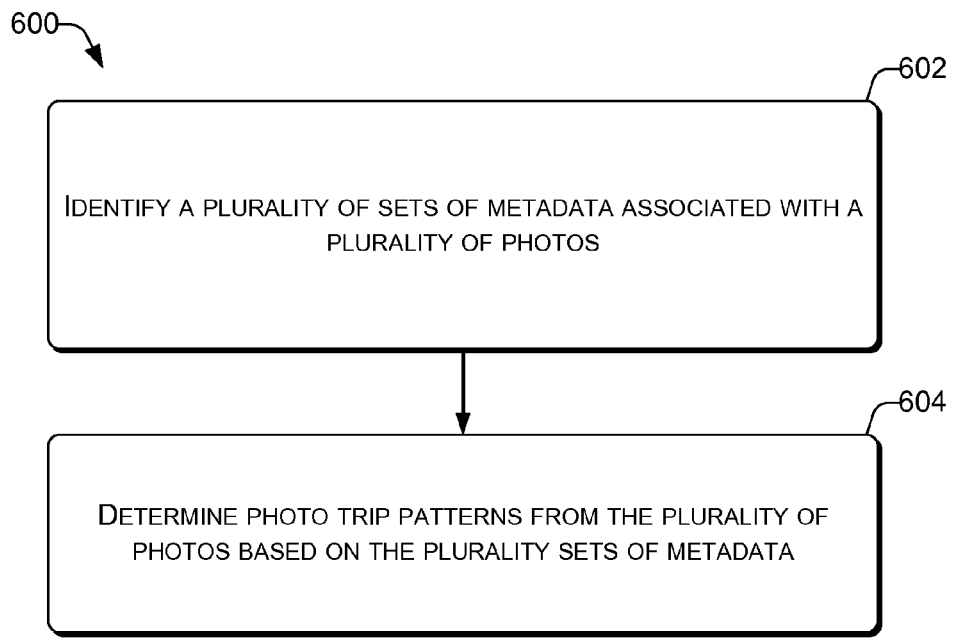
FIGS. 6 through 10 are flow diagrams illustrating exemplary processes for reconstructing photo trip patterns.

FIG. 6 illustrates an exemplary process 600 for reconstructing photo trip patterns according to one embodiment. The process 600 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

It should be noted that the order in which the process is described is not intended to be construed as a limitation, and any number of the described process blocks can be combined in any order to implement the process, or an alternate process. Additionally, individual blocks maybe deleted from the process without departing from the spirit and scope of the subject matter described herein.

At block 602, a plurality of sets of metadata associated with a plurality of photos is identified. In one implementation, the sets of metadata are associated with respective groups of photos. For instance, as shown in FIG. 1, the sets of metadata 108 are associated with the collections of photos 106 captured at various locations. The metadata may include different information. In the described implantation, the metadata includes geographical information related to a location where the respective photo was captured. The metadata may also include a timestamp, a photo ID, a tag, etc., as shown in FIG. 3. At block 604, photo trip patterns from the plurality of photos are determined based on the plurality of sets of metadata. In one implementation, each photo trip pattern is representative of a set of frequently visited locations as well as the associated typical transition times. For instance, as shown in FIG. 5, photo trip patterns from the photos of the photo collection 500 are determined as photo trip 1, photo trip 2, and photo trip 3 based on sets of metadata such as the sets of metadata 108.

Figure 7:
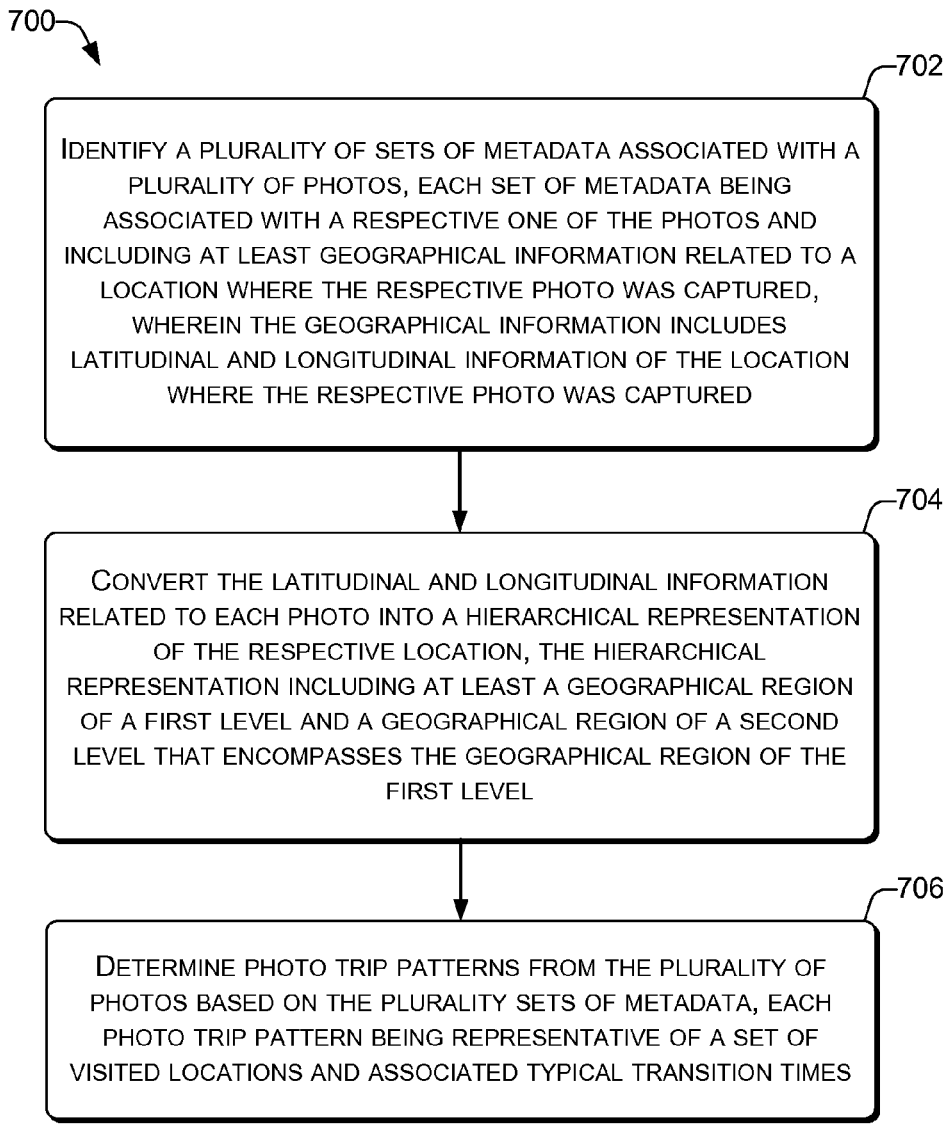

FIG. 7 illustrates an exemplary process 700 for reconstructing photo trip patterns according to one embodiment. At block 702, a plurality of sets of metadata associated with a plurality of photos is identified. Each set of metadata is associated with a respective one of the photos and includes at least geographical information related to a location where the respective photo was captured. In one embodiment, the geographical information includes the latitudinal and longitudinal coordinates of the location where the respective photo was captured. At block 704, the latitudinal and longitudinal coordinates related to each photo are converted into a hierarchical representation of the respective location. In one embodiment, the hierarchical representation includes at least a geographical region of a first level and a geographical region of a second level that encompasses the geographical region of the first level. For example, the latitude/longitude associated to a photo can be converted to a city, state, and country. At block 706, photo trip patterns from the plurality of photos are determined based on the plurality of sets of metadata. Each photo trip pattern is representative of a set of frequently visited locations and the associated typical transition times.

In one embodiment, when determining the photo trip patterns, the plurality of photos are segmented into subsets of photos based on at least the geographical information related to each of the photos. For example, the photos may be segmented based on the latitude/longitude of each photo. In one implementation, a respective location gap between the location where the respective photo was captured and a reference location is determined for each of the plurality of photos. Additionally, the photos having respective location gaps that fall within a respective threshold location gap range are grouped into a respective subset of photos.

In an alternative embodiment, when determining the photo trip patterns, the plurality of photos are segmented into subsets of photos based on the geographical information and time information related to each of the photos. For example, besides the latitude/longitude associated with each photo, the timestamp associated with each photo is also utilized in segmenting a photo collection. In one implementation, a respective location gap between the location where the respective photo was captured and a reference location is determined for each of the plurality of photos. Additionally, for each pair of consecutively visited locations, a respective transition time gap between the last photo captured at the first location and the first photo captured at a second location that was visited after the first location. Furthermore, photos having respective location gaps that fall within a respective threshold location gap range are grouped into a respective subset of photos. In another implementation, a sequence of locations is identified as a photo trip pattern. Each location in the sequence of locations has at least one subset of photos associated therewith, and is separated from another location by a respective transition time gap that is greater than a threshold transition time gap. Moreover, semantics associated with each photo trip pattern are identified based on the respective tag associated with each of the photos.

Figure 8:
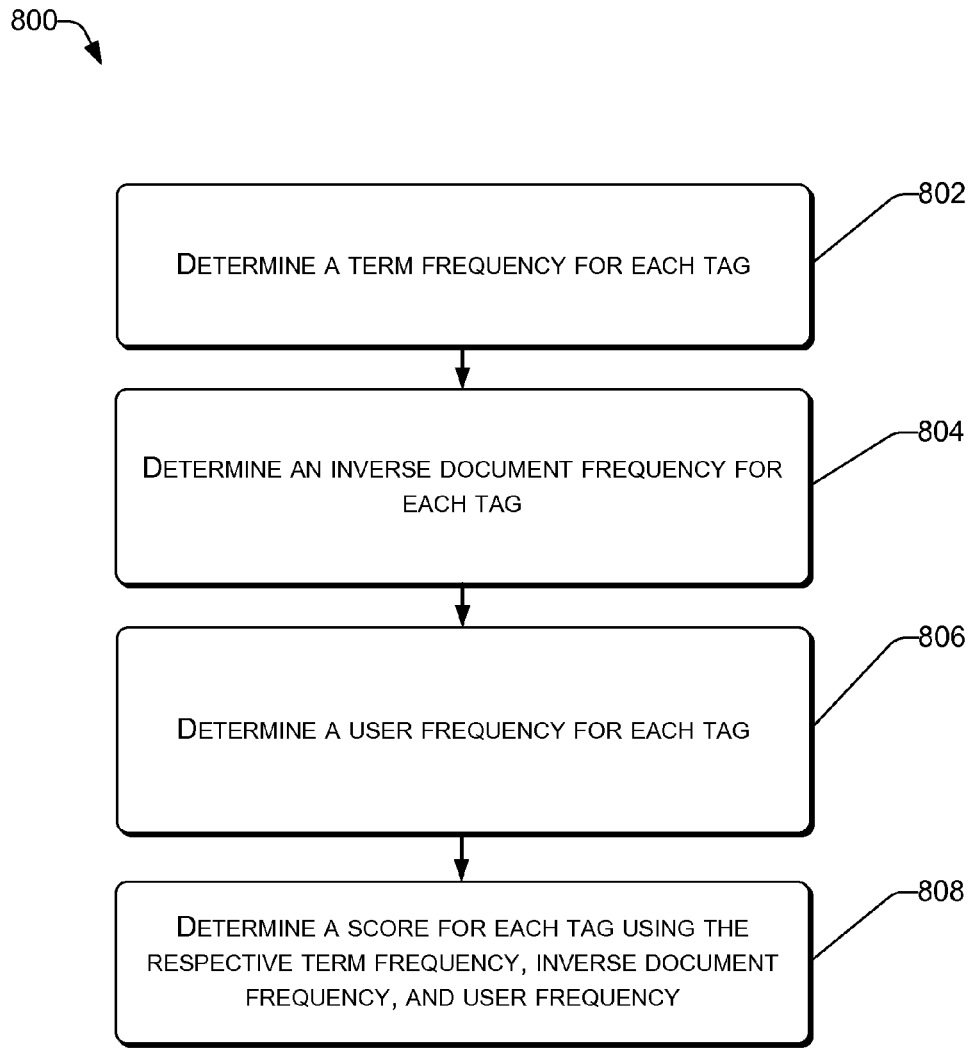

FIG. 8 illustrates an exemplary process 800 as one implementation of a part of identifying semantics associated with the photo trip patterns according to one embodiment. In particular, the process 800 describes one exemplary implementation of identifying the semantics associated with the photo trip patterns. At block 802, a term frequency is determined for each tag as a number of times the respective tag is related to photos captured in the plurality of locations. At block 804, an inverse document frequency is determined for each tag as a ratio of a number of total photos of the plurality of photos to a number of the photos having the respective tag associated therewith. At block 806, a user frequency is determined for each tag as a ratio of a number of photo owners who use the respective tag to describe at least one photo of the plurality of photos to a number of total photo owners of the plurality of photos. In another embodiment, the process 800 further determines a score for each tag using the respective term frequency, inverse document frequency, and user frequency at block 808.

Figure 9:
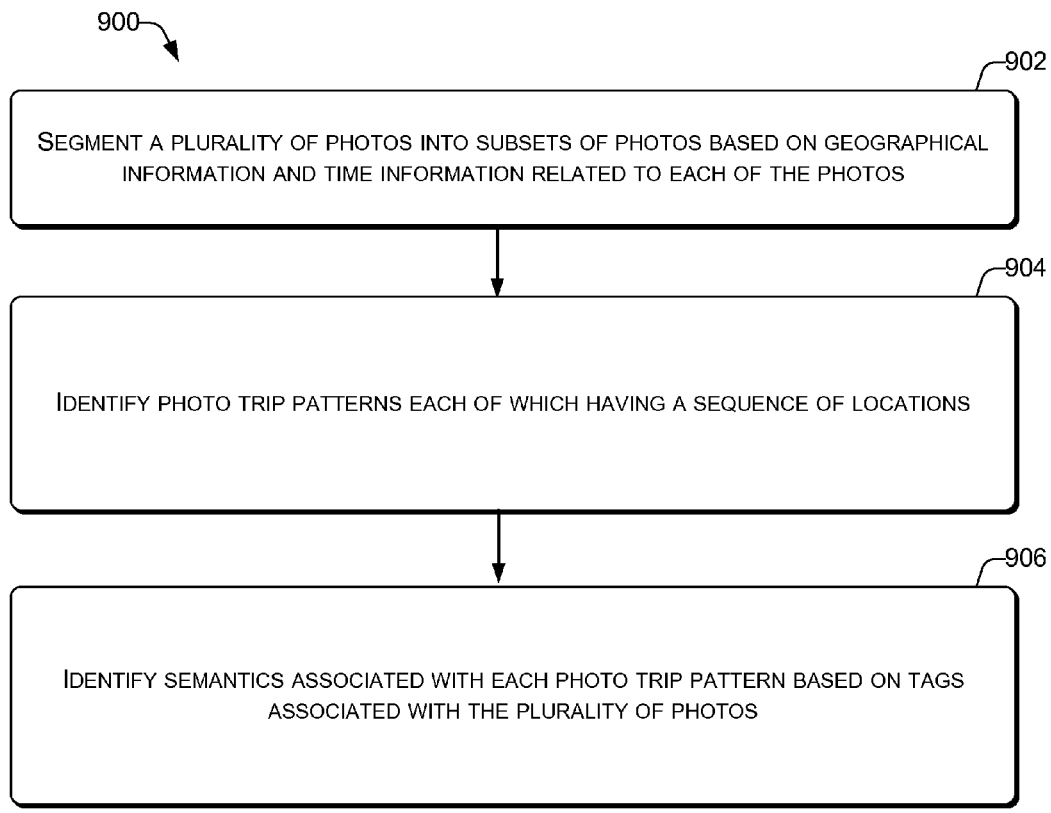

FIG. 9 illustrates an exemplary process 900 for reconstructing photo trip patterns according to one embodiment. At block 902, a plurality of photos is segmented into subsets of photos based on geographical information and time information related to each of the photos. At block 904, photo trip patterns are identified. Each photo trip pattern has a sequence of locations. Each location has at least one of the subsets of photos associated therewith and is separated from another location by a respective transition time gap greater than a threshold transition time gap. At block 906, semantics associated with each photo trip pattern are identified based on tags associated with the plurality of photos. Each of the tags is associated with at least a respective one of the plurality of photos and describes the location where the respective photo was captured.

Figure 10:
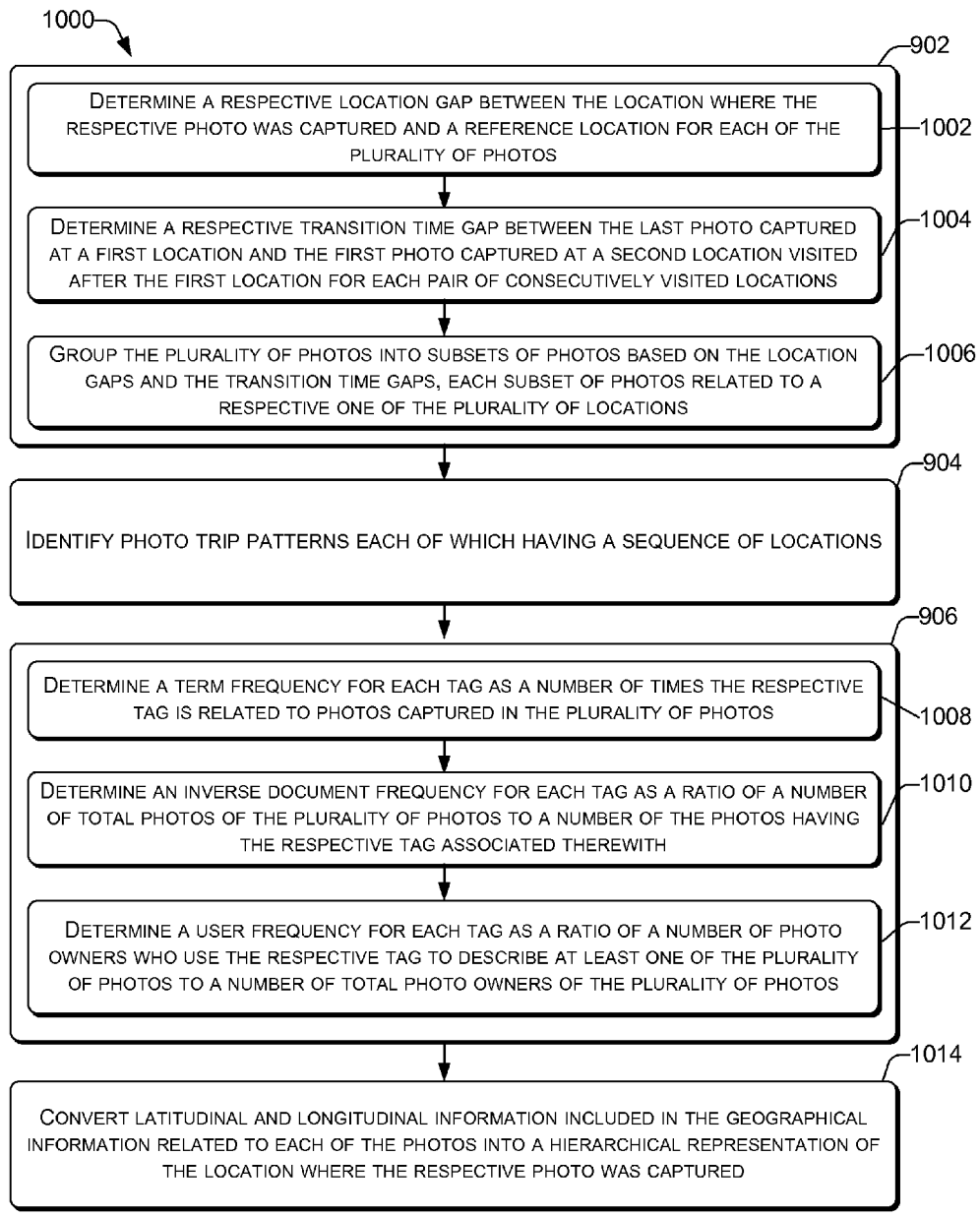

FIG. 10 illustrates an exemplary process 1000 as one implementation of the process 900 according to one embodiment. To segment the plurality of photos into subsets of photos, at block 1002, a respective location gap between the location where the respective photo was captured and a reference location is determined for each of the plurality of photos. Next, at block 1004, a respective transition time gap between the last photo captured at a first location and the first photo captured at a second location that was visited after the first location is determined for each pair of consecutively visited locations. Further, at block 1006, the plurality of photos is grouped into subsets of photos based on the location gaps and the transition time gaps, where each subset of photos is related to a respective one of the plurality of locations. To identify the semantics associated with each photo trip pattern, at block 1008, a term frequency is determined for each tag as a number of times the respective tag is related to photos captured in the plurality of photos. Next, at block 1010, an inverse document frequency is determined for each tag as a ratio of a number of total photos of the plurality of photos to a number of the photos having the respective tag associated therewith. Further, at block 1012, a user frequency is determined for each tag as a ratio of a number of photo owners who use the respective tag to describe at least one photo of the plurality of photos to a number of total photo owners of the plurality of photos.

In an alternative embodiment, the process 1000 further extends the process 900. At block 1014, the latitudinal and longitudinal information included in the geographical information related to each of the photos is converted into a hierarchical representation of the location where the respective photo was captured. The hierarchical representation includes at least a geographical region of a first level and a geographical region of a second level that encompasses the geographical region of the first level.

Exemplary Computing Device

Figure 11:
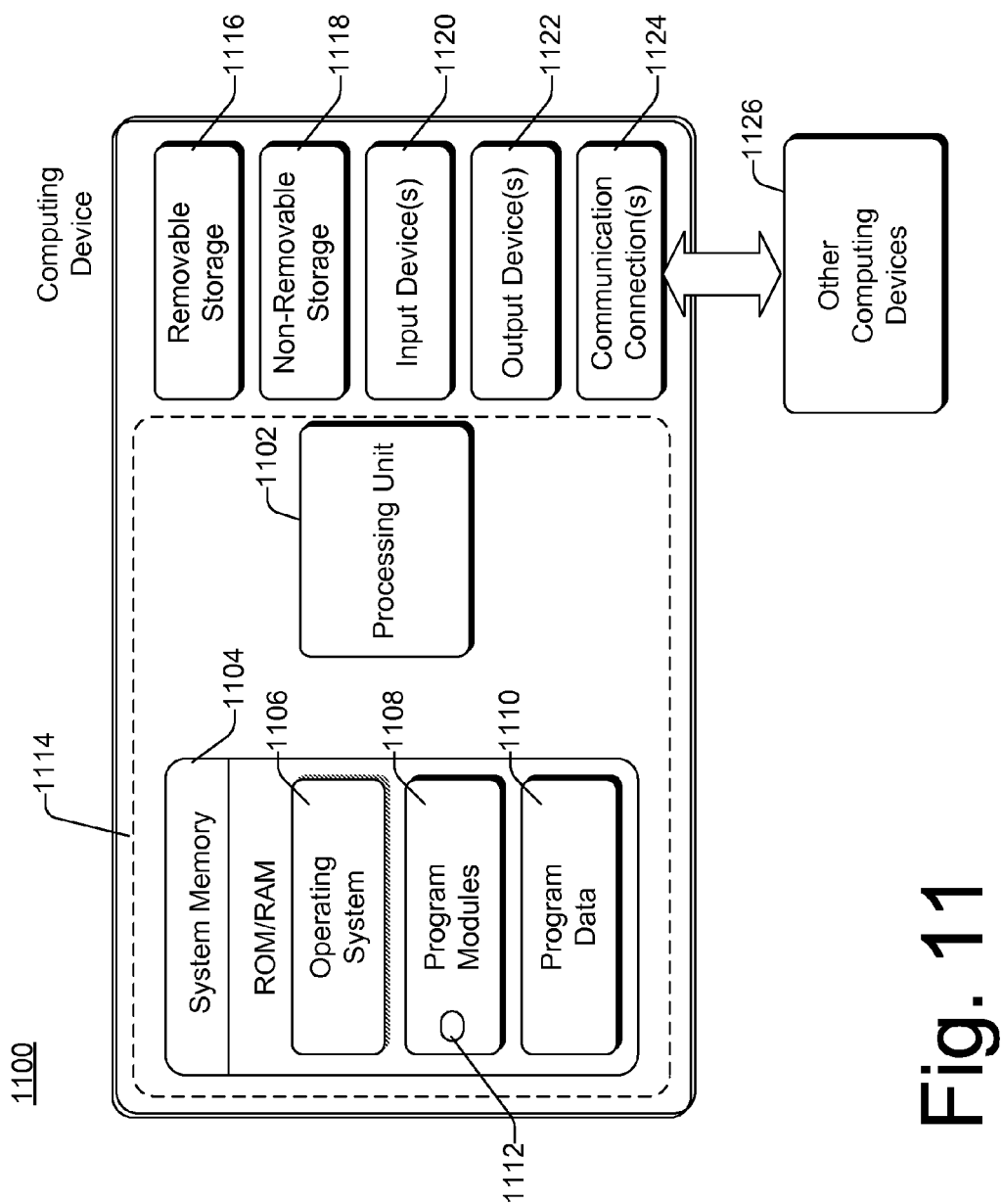
FIG. 11 is a block diagram showing an exemplary computing device.

FIG. 11 illustrates a representative computing device 1100 that may implement the techniques for reconstructing photo trip patterns based on geo-tagged photos. However, it will be readily appreciated that the techniques disclosed herein may be implemented in other computing devices, systems, and environments. The computing device 1100 shown in FIG. 11 is only one example of a computing device and is not intended to suggest any limitation as to the scope of use or functionality of the computer and network architectures.

In at least one configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination thereof. System memory 1104 may include an operating system 1106, one or more program modules 1108, and may include program data 1110. The computing device 1100 is of a very basic configuration demarcated by a dashed line 1114. Again, a terminal may have fewer components but may interact with a computing device that may have such a basic configuration.

In one embodiment, the program module 1108 includes a photo trip pattern reconstruction module 1112. The photo trip pattern reconstruction module 1112 identifies a plurality of sets of metadata associated with a plurality of photos. Each set of metadata is associated with a respective one of the photos and includes at least geographical information related to a location where the respective photo was captured. Based on the plurality sets of metadata, the photo trip pattern reconstruction module 1112 also determines photo trip patterns from the plurality of photos, where each photo trip pattern is representative of a set of visited locations and associated typical transition times. For example, the photo trip pattern reconstruction module 1112 may carry out one or more processes as described above with reference to FIGS. 6-10.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1116 and non-removable storage 1118. Computer storage media may include volatile and nonvolatile, removable and non-removable media implemented in any method or technology for storage of information, such as computer readable instructions, data structures, program modules, or other data. System memory 1104, removable storage 1116 and non-removable storage 1118 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of the computing device 1100. Computing device 1100 may also have input device(s) 1120 such as keyboard, mouse, pen, voice input device, touch input device, etc. Output device(s) 1122 such as a display, speakers, printer, etc. may also be included.

Computing device 1100 may also contain communication connections 1124 that allow the device to communicate with other computing devices 1126, such as over a network. These networks may include wired networks as well as wireless networks. Communication connections 1124 are some examples of communication media. Communication media may typically be embodied by computer readable instructions, data structures, program modules, etc.

It is appreciated that the illustrated computing device 1100 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
identifying a plurality of sets of metadata associated with a plurality of photos, at least one set of metadata being associated with a respective one of the plurality of photos and including at least geographical information related to a location where the respective photo was captured; and
determining, by using a processor, photo trip patterns from the plurality of photos based at least in part on the plurality of sets of metadata, at least one photo trip pattern being representative of a set of visited locations and associated transition times, in which the set of visited locations is segmented into different trips based on a calculated gap between events, the gap between events being calculated according to a function of a transition time gap between consecutive locations, a location gap between consecutive locations, and a parameter to balance an effect on the gap between events attributable to the transition time gap and an effect on the gap between events attributable to the location gap, such that:
a first value of the parameter results in a first calculated gap between events;
a second value of the parameter value, different from the first value of the parameter, results in a second calculated gap between events, different from the first calculated gap between events;
the calculated gap between events represents no change of trips when the calculated gap between events is less than a threshold value; and
the calculated gap between events represents a change of trips when the calculated gap between events is greater than a threshold value.

2. The method of claim 1, wherein the at least one set of metadata further includes:
time information related to date and time on which the respective photo was captured;
a photo identification associated with the respective photo;
a user identification associated with a photo owner by whom the respective photo was captured; and
a tag associated with the respective photo having description of the location where the photo was captured.

3. The method of claim 1, wherein determining photo trip patterns comprises:
segmenting the plurality of photos into subsets of photos based at least in part on the geographical information related to one or more of the plurality of photos.

4. The method of claim 3, wherein segmenting the plurality of photos into subsets of photos comprises:
determining a respective location gap between the location where the respective photo was captured and a reference location for one or more of the plurality of photos; and
grouping photos having the respective location gaps that fall within a respective threshold location gap range into a respective subset of photos.

5. The method of 1, wherein the at least one set of metadata associated with the respective one of the plurality of photos further includes time information related to date and time on which the respective photo was captured, and wherein determining photo trip patterns comprises:

segmenting the plurality of photos into subsets of photos based at least in part on the geographical information and the time information related to one or more of the plurality of photos.

6. The method of claim 1, wherein the at least one set of metadata associated with the respective one of the plurality of photos further includes time information related to date and time on which the respective photo was captured, and wherein determining photo trip patterns comprises:
  determining a respective location gap between the location where the respective photo was captured and a reference location for one or more of the plurality of photos;
  determining a respective transition time gap between the last photo captured at a first location and the first photo captured at a second location visited after the first location for a pair of consecutively visited locations; and
  grouping the plurality of photos into subsets of photos based at least in part on the location gaps and the transition time gaps, in which one or more of the photos of the subsets of photos are related to a respective one of the plurality of locations and having a transition time gap with another subset greater than a threshold transition time gap.

7. The method of claim 6, wherein determining photo trip patterns further comprises:
  identifying a sequence of locations as a photo trip pattern, at least one location having at least one subset of photos associated therewith and being separated from another location by a respective transition time gap greater than the threshold transition time gap.

8. The method of claim 1, wherein at least one set of metadata associated with a respective one of the photos further includes a tag associated with the respective photo having description of the location where the photo was captured, and wherein determining photo trip patterns further comprises:
  identifying semantics associated with the at least one photo trip pattern based at least in part on the tag associated with one or more of the plurality of photos.

9. The method of claim 8, wherein identifying semantics associated with the at least one photo trip pattern comprises:
  determining a term frequency for the tag as a number of times the respective tag is related to photos captured in the plurality of locations;
  determining an inverse document frequency for the tag as a ratio of a number of total photos of the plurality of photos to a number of the photos having the respective tag associated therewith; and
  determining a user frequency for the tag as a ratio of a number of photo owners who use the respective tag to describe at least one of the plurality of photos to a number of total photo owners of the plurality of photos.

10. The method of claim 9 further comprising:
  determining a score for the tag using the respective term frequency, inverse document frequency, and user frequency.

11. The method of claim 8, wherein the location is represented by a hierarchy of geographical regions including at least a first level of geographical region and a second level of geographical region that includes the first level of geographical region, and wherein identifying semantics associated with the photo trip pattern based at least in part on the tag associated with the plurality of photos comprises identifying semantics associated with the photo trip pattern by considering tags at the first level of geographical region.

12. The method of claim 1, wherein the geographical information includes latitudinal and longitudinal information of the location where the respective photo was captured.

13. The method of claim 12 further comprising:
  converting the latitudinal and longitudinal information to a hierarchical representation of the respective location, the hierarchical representation including at least a geographical region of a first level and a geographical region of a second level that encompasses the geographical region of the first level.

14. The method of claim 13, wherein the hierarchical representation of the location includes a name of a city where the respective photo was captured, a name of a state in which the city is located, and a name of a country in which the state is located.

15. A method comprising:
  segmenting a plurality of photos into subsets of photos based at least in part on geographical information and time information related to the plurality of photos;
  identifying, by using a processor, photo trip patterns, at least one photo trip pattern having a sequence of locations, a location of the sequence of locations having at least one of the subsets of photos associated therewith and being separated from another location based on a determination that a calculated event gap value is greater than a threshold event gap value, wherein the event gap value is calculated based on a transition time gap and a location gap, adjusted by a parameter to balance respective contributions to the event gap value by the transition time gap and the location gap; and
  identifying semantics associated with the at least one photo trip pattern based at least in part on tags associated with the plurality of photos, one or more of the tags being associated with at least one of the plurality of photos and describing the location where the at least one of the plurality of photos was captured.

16. The method of claim 15, wherein segmenting a plurality of photos into subsets of photos based at least in part on geographical information and time information related to the plurality of photos comprises:
  determining a respective location gap between the location where the respective photo was captured and a reference location for one or more of the plurality of photos;
  determining a respective transition time gap between a last photo captured at a first location and a first photo captured at a second location visited after the first location for a pair of consecutively visited locations; and
  grouping the plurality of photos into the subsets of photos based at least in part on the location gaps and the transition time gaps.

17. The method of claim 15, wherein identifying semantics associated with the at least one photo trip pattern based at least in part on tags associated with the plurality of photos comprises:
  determining a term frequency for a tag as a number of times the tag is related to photos captured in the plurality of locations;
  determining an inverse document frequency for the tag as a ratio of a number of total photos of the plurality of photos to a number of the photos having the tag associated therewith; and
  determining a user frequency for the tag as a ratio of a number of photo owners who use the tag to describe at least one of the plurality of photos to a number of total photo owners of the plurality of photos.

18. The method of claim 15 further comprising:
converting latitudinal and longitudinal information included in the geographical information into a hierarchical representation of the location where the respective photo was captured, the hierarchical representation including at least a geographical region of a first level and a geographical region of a second level that encompasses the geographical region of the first level.

19. A computer storage device storing computer-executable instructions that, when executed by one or more processors, perform acts comprising:
identifying a plurality of sets of metadata associated with a plurality of photos, at least one set of metadata being associated with a respective one of the photos and including at least geographical information related to a location where the respective photo was captured; and
determining photo trip patterns from the plurality of photos based at least in part on the plurality sets of metadata, at least one photo trip pattern being representative of a set of visited locations and associated typical transition times, in which the set of visited locations is segmented into different trips by comparing an event gap value to a threshold gap value, wherein the event gap value is calculated based on a transition time gap, a location gap, and a parameter to reflect a weight given to the transition time gap and a weight given to the location gap, such that a first value of the parameter results in a first event gap value, and a second value of the parameter, different from the first value of the parameter, results in a second event gap value, different from the first event gap value.

20. The computer storage device of claim 19, wherein the act of determining photo trip patterns from the plurality of photos based at least in part on the plurality sets of metadata comprises:
segmenting the plurality of photos into subsets of photos based at least in part on the geographical information related to at least one of the plurality of photos;
identifying the photo trip patterns wherein the location has at least one of the subsets of photos associated therewith; and
identifying semantics associated with the at least one photo trip pattern based at least in part on tags associated with the plurality of photos, at least one of the tags being associated with a respective one of the plurality of photos and describing the location where the respective photo was captured.

* * * * *